(12) United States Patent
Jang

(10) Patent No.: US 11,777,766 B2
(45) Date of Patent: *Oct. 3, 2023

(54) SIGNAL RECEIVING APPARATUS AND SIGNAL PROCESSING METHOD THEREOF

(71) Applicant: LG ELECTRONICS INC., Seoul (KR)

(72) Inventor: Eunkwang Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,883

(22) Filed: Jul. 1, 2022

(65) Prior Publication Data

US 2022/0345337 A1    Oct. 27, 2022

Related U.S. Application Data

(63) Continuation of application No. 17/119,036, filed on Dec. 11, 2020, now Pat. No. 11,411,781.

(30) Foreign Application Priority Data

| Jul. 24, 2020 | (KR) | ......................... 10-2020-0092515 |
| Nov. 3, 2020 | (KR) | ......................... 10-2020-0145482 |

(51) Int. Cl.
  *H04L 25/03* (2006.01)
  *H04B 1/16* (2006.01)
(52) U.S. Cl.
  CPC ......... *H04L 25/03057* (2013.01); *H04B 1/16* (2013.01)

(58) Field of Classification Search
  CPC .................................................. H04L 25/03057
  USPC .......................................................... 375/233
  See application file for complete search history.

(56) References Cited

U.S. PATENT DOCUMENTS

| 5,999,511 A | 12/1999 | Jeon |
| 6,690,739 B1 | 2/2004 | Mui |
| 9,276,782 B1 | 3/2016 | Zhang et al. |
| 9,705,708 B1 | 7/2017 | Jin et al. |
| 10,778,163 B2 | 9/2020 | Lee |
| 11,411,781 B2 * | 8/2022 | Jang .................. H04L 25/03057 |
| 2006/0245485 A1 | 11/2006 | Martin et al. |

(Continued)

FOREIGN PATENT DOCUMENTS

| EP | 2863598 | 4/2015 |
| KR | 1019990051851 | 7/1999 |

(Continued)

OTHER PUBLICATIONS

Korean Intellectual Property Office Application Serial No. 10-2020-0145482, Office Action dated Nov. 1, 2021, 5 pages.

(Continued)

*Primary Examiner* — Lihong Yu
(74) *Attorney, Agent, or Firm* — LEE HONG DEGERMAN KANG WAIMEY

(57) ABSTRACT

Disclosed herein are a signal receiving apparatus capable of improving signal compensation performance and a signal processing method thereof. The signal receiving apparatus includes a terminal configured to receive a signal from an external device; and an equalizer configured to reduce inter-symbol interference of the signal received through the terminal. A swing level of an output signal output from the equalizer is maintained in a preset range.

11 Claims, 7 Drawing Sheets

(56) References Cited

U.S. PATENT DOCUMENTS

| | | |
|---|---|---|
| 2014/0086297 A1 | 3/2014 | Shen et al. |
| 2014/0269890 A1 | 9/2014 | Hoang et al. |
| 2019/0052488 A1 | 2/2019 | Fujii et al. |
| 2022/0029864 A1 | 1/2022 | Jang |

FOREIGN PATENT DOCUMENTS

| | | |
|---|---|---|
| KR | 1020080005233 | 1/2008 |
| KR | 1020200007397 | 1/2020 |

OTHER PUBLICATIONS

European Patent Office Application Serial No. 20214967.0, Search Report dated Apr. 15, 2021, 8 pages.
Korean Intellectual Property Office Application No. 10-2020-0145482, Office Action dated May 16, 2022, 5 pages.
U.S. Appl. No. 17/119,036, Office Action dated Oct. 5, 2021, 16 pages.
U.S. Appl. No. 17/119,036, Final Office Action dated Jan. 19, 2022, 12 pages.

* cited by examiner (a)

(b)

(a)

(b)

SIGNAL RECEIVING APPARATUS AND SIGNAL PROCESSING METHOD THEREOF

CROSS-REFERENCE TO RELATED APPLICATIONS

This application is a continuation of U.S. patent application Ser. No. 17/119,036, filed on Dec. 11, 2020, which claims the benefit of earlier filing date and right of priority to Korean Patent Application Nos. 10-2020-0092515, filed on Jul. 24, 2020, and 10-2020-0145482, filed on Nov. 3, 2020, the contents of which are hereby incorporated by reference herein in its entirety.

BACKGROUND

The present disclosure relates to a signal receiving apparatus and a signal processing method thereof.

More specifically, the present disclosure relates to a signal receiving apparatus including at least one equalizer and a signal processing method thereof.

A high definition multimedia interface (HDMI) is one of an uncompressed digital video/audio interface standards. The HDMI transmits high-definition multimedia information as high-frequency signal, which may cause problems such as noise or signal leakage. In particular, as HDMI 2.1 (or higher) is supported, the frequency increases. In addition, as signal transmission through a longer cable is expected, signal attenuation is expected to be more severe. Therefore, the role of an equalizer of a signal receiving apparatus is becoming more important.

SUMMARY

An object of the present disclosure devised to solve the problem lies in a signal receiving apparatus capable of improving signal compensation performance of an equalizer, and a signal processing method thereof.

An object of the present disclosure devised to solve the problem lies in a signal receiving apparatus for implementing automatic gain control (AGC) in an equalizer, and a signal processing method thereof.

A signal receiving apparatus according to an embodiment of the present disclosure comprises a terminal configured to receive a signal from an external device; and an equalizer configured to reduce inter-symbol interference of the signal received through the terminal, wherein a swing level of an output signal output from the equalizer is maintained in a preset range.

The equalizer comprises a first equalizer configured to amplify the signal received through the terminal and a second equalizer configured to reduce inter-symbol interference in a signal output from the first equalizer, and wherein a swing level of the signal output from the first equalizer to the second equalizer falls within the preset range.

The signal receiving apparatus further comprises a processor configured to adjust the swing level of the output signal.

The signal receiving apparatus further comprises a detector configured to detect the swing level of the output signal, wherein the processor is configured to adjust the swing level of the output signal such that the swing level of the output signal falls within the preset range based on a result of detection of the detector.

The processor is configured to determine DC gain of the first equalizer for enabling the swing level of the output signal to fall within the preset range.

The processor is configured to determine the DC gain by stepwise changing the DC gain until the swing level of the output signal falls within the preset range.

When the DC gain is determined, the processor is configured to determine AC gain by detecting an error rate of the output signal with respect to the determined DC gain.

The equalizer compensates for the signal received through the terminal according to the determined DC gain and the AC gain.

The first equalizer is a continuous time linear equalizer (CTLE), and the second equalizer is a decision feedback equalizer (DFE).

A signal processing method of a signal receiving apparatus according to an embodiment of the present disclosure comprises receiving a signal from an external device; and performing signal processing to reduce inter-symbol interference of the received signal through an equalizer, wherein a swing level of an output signal output from the equalizer is maintained in a preset range.

The performing of signal processing comprises: by a first equalizer, amplifying the received signal; and by a second equalizer, reducing inter-symbol interference in a signal output from the first equalizer, wherein a swing level of the signal output from the first equalizer to the second equalizer falls within the preset range.

The signal processing method further comprises adjusting the swing level of the output signal such that the swing level of the output signal falls within the preset range.

The signal processing method further comprises determining DC gain of the first equalizer for enabling the swing level of the output signal to fall within the preset range.

The determining of the DC gain comprises determining the DC gain by stepwise changing the DC gain until the swing level of the output signal falls within the preset range.

The signal processing method further comprises when the DC gain is determined, determining AC gain by detecting an error rate of the output signal with respect to the determined DC gain.

According to the present disclosure, since operation stability of an equalizer is secured and performance is improved, inter-symbol interference is further reduced.

According to the present disclosure, since adaptive equalizer gain adjustment is possible with respect to an input signal, it is possible to maximize compensation efficiency of signals received through various cables and various signal transmitting apparatuses.

DETAILED DESCRIPTION OF THE EMBODIMENTS

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

Figure 1:
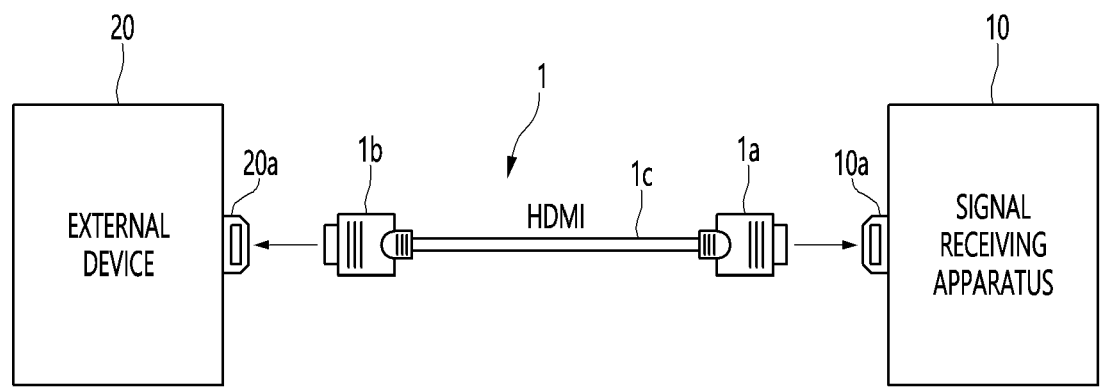
FIG. 1 is a schematic view showing a state in which a signal receiving apparatus according to an embodiment of the present disclosure receives a signal through a high definition multimedia interface (HDMI).

FIG. 1 is a schematic view showing a state in which a signal receiving apparatus according to an embodiment of the present disclosure receives a signal through a high definition multimedia interface (HDMI).

As shown in FIG. 1, the signal receiving apparatus 10 may be connected to an external device 20 through an interface 1 to receive a video/audio/control signal from the external device 20.

Here, the interface 1 may be a high definition multimedia interface (HDMI), but this is merely an example and is not limited thereto. In the present disclosure, for convenience of description, it is assumed that the interface 1 is an HDMI.

The signal receiving apparatus 10 includes a terminal 10a connected with the HDMI 1, and the terminal 10a may receive the signal of the external device 20 through the HDMI 1. The terminal 10a may be an HDMI terminal. Similarly, the external device 20 may include a terminal 20a connected with the HDMI 1, and the terminal 20a may transmit a signal to the HDMI 1.

The HDMI 1 may include a pair of connectors 1a and 1b and an HDMI cable 1c located between the pair of connectors 1a and 1b. The HDMI cable 1c may include signal lines for signal transmission between the pair of connectors 1a and 1b, and the connectors 1a and 1b may be terminals for connection to a sink apparatus or a source apparatus.

The signal receiving apparatus 10 may be a sink apparatus, and the sink apparatus may include all types of apparatuses capable of receiving and reproducing signals (e.g., HDMI signals) from a source apparatus. For example, the sink apparatus may be implemented as various apparatuses such as a TV, a computer, a DVD player, a cellular phone, a smartphone, a personal digital assistant (PDA), a laptop PC, a tablet PC, an electronic book, an electronic picture frame, a kiosk, etc.

The external device 20 may be a source apparatus and includes all types of apparatus capable of generating and transmitting signals (e.g., HDMI signals). For example, the external device 20 may be implemented as various apparatuses such as a TV, a computer, a DVD player, a cellular phone, a smartphone, a personal digital assistant (PDA), a laptop PC, a tablet PC, an electronic book, an electronic picture frame, a kiosk, a Blu-ray disc, a set-top box, etc.

Figure 2:
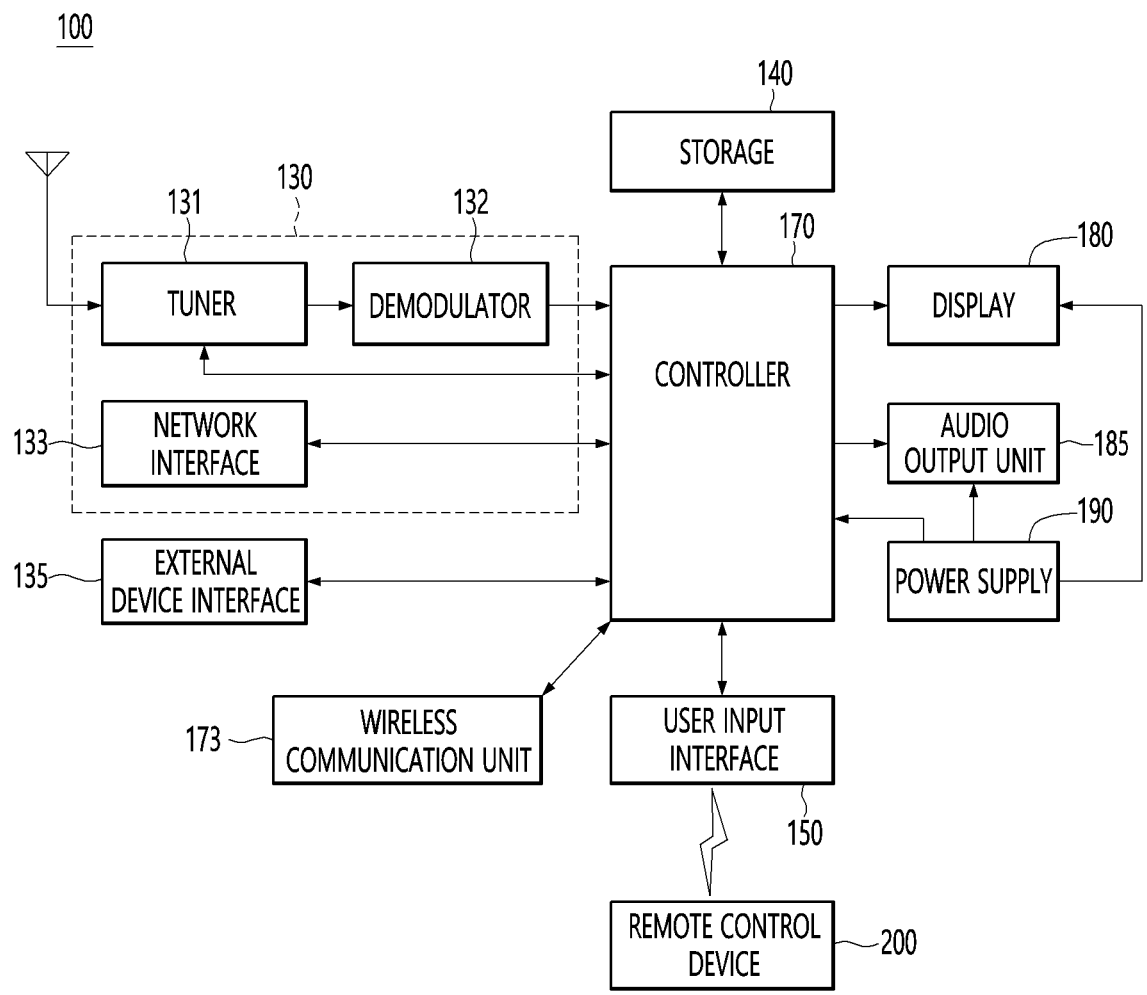
FIG. 2 is a block diagram showing the configuration of the signal receiving apparatus of FIG. 1.

FIG. 2 is a block diagram showing the configuration of the signal receiving apparatus of FIG. 1.

The signal receiving apparatus 10 may be a display apparatus 100 described below or a component configuring the display apparatus 100. In the present disclosure, it is assumed that the signal receiving apparatus 10 is the display apparatus 100 described below.

Meanwhile, the signal receiving apparatus 10 may include some or all of the components shown in FIG. 2. That is, FIG. 2 shows only an example of describing the configuration of the signal receiving apparatus 10, and the configuration of the signal receiving apparatus 10 may be various.

Referring to FIG. 2, a display device 100 can include a broadcast receiver 130, an external device interface 135, a storage 140, a user input interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote controller 200 or transmit control signals from the controller 170 to the remote controller 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 2 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 2, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 2, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a dc/dc converter for converting a level of the DC source power.

The remote controller 200 transmits a user input to the user input interface 150. To this end, the remote controller 200 may use Bluetooth, radio frequency (RF) communication, infrared (IR) communication, ultra wideband (UWB), ZigBee, or the like. In addition, the remote controller 200 may receive video, audio, or data signal output from the user input interface 150 and display the video, audio, or data signal or output sound.

Figure 3:
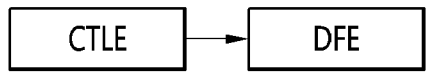
FIG. 3 is a view showing the physical layer of the external device interface shown in FIG. 2.

FIG. 3 is a view showing the physical layer of the external device interface shown in FIG. 2.

The external device interface 135 of the signal receiving apparatus 10 may be an HDMI interface, but this is merely an example and is not limited thereto. In the present disclosure, it is assumed that the external device interface 135 is an HDMI interface, but this is only for convenience of description.

The physical layer of the HDMI interface may include at least one equalizer. Here, the equalizer may reinforce or cut the received signal, thereby reducing a jitter phenomenon wherein some aspects of a wave are deviated or displaced at a high frequency.

As shown in FIG. 3, the HDMI interface includes a first equalizer and a second equalizer. The first equalizer may be a signal amplification linear equalizer and the second equalizer may be a non-linear equalizer for eliminating non-amplification bit interference (inter-symbol interference (ISI)). For example, the first equalizer may be a continuous time linear equalizer (CTLE) and the second equalizer may be a decision feedback equalizer (DFE), but this is only an example and is not limited thereto.

The CTLE may amplify a signal to adjust all frequency components of an input signal to a similar magnitude, thereby improving eye diagram performance.

The DFE may be a circuit for improving BER performance by eliminating inter-symbol interference of an input signal using a feedback filter. The DFE may compensate for a signal without amplifying a noise level.

When an HDMI is connected to an HDMI terminal, the CTLE may receive the signal of the external device through the HDMI terminal. That is, the CTLE may receive the signal of the external device received by the HDMI terminal, process the signal input through the HDMI terminal according to equalizer gain, and output the processed signal to the DFE.

The DFE may reduce inter-symbol interference by compensating for a signal through a subtraction operation between a signal output from the CTLE and a DFE variable ((3, ISI term). At this time, the DFE variable is a feedback signal determined by an internal operation logic and is affected by a signal input to the DFE, that is, a signal output from the CTLE. That is, the signal output from the CTLE to the DFE may determine the DFE variable and affect the DFE logic. Accordingly, when the magnitude of the signal output from the CTLE to the DFE is out of the allowable voltage range of a digital-to-analog converter (DAC) in the DFE, the DFE variable may not be properly calculated and thus signal compensation may not be optimally performed. Accordingly, the magnitude of the signal output from the CTLE to the DFE shall be smaller than the allowable voltage range of the DAC. That is, there may be a need for a method of performing control such that the magnitude of the signal output from the CTLE to the DFE falls within the allowable voltage range of the DAC.

Figure 4:
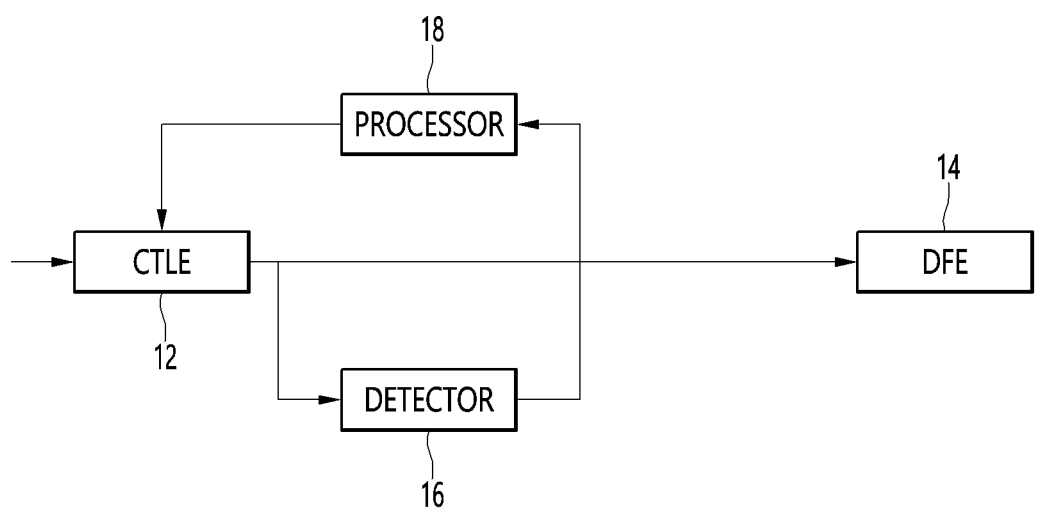
FIG. 4 is a view showing the physical layer of an external device interface according to an embodiment of the present disclosure.

FIG. 4 is a view showing the physical layer of an external device interface according to an embodiment of the present disclosure.

The external device interface 135 of the signal receiving apparatus 10 according to the embodiment of the present disclosure may be an HDMI interface, but this is only an example and is not limited thereto. In the present disclosure, it is assumed that the external device interface 135 is an HDMI interface, but this is only for convenience of description.

As shown in FIG. 4, the physical layer of the HDMI interface may include at least some or all of one or more equalizers 12 and 14, a detector 16 and a processor 18.

The equalizers 12 and 14 may reduce inter-symbol interference of the signal received through the HDMI terminal.

The detector 16 may detect the swing level of an output signal output from the first equalizer 12 to the second equalizer 14.

The processor 18 may control the equalizers 12 and 14 and the detector 16. For example, the processor 18 may adjust the swing level of the output signal output from the first equalizer 12 to the second equalizer 14.

In particular, according to the present disclosure, the processor 18 may control at least some or all of the equalizers 12 and 14 or the detector 16, such that the swing level of the output signal output from the equalizers 12 and 14 is constantly maintained in a preset range.

More specifically, the equalizers 12 and 14 include the first equalizer 12 and the second equalizer 14, the first equalizer 12 may be a signal amplification linear equalizer, and the second equalizer 14 may be a non-linear equalizer for eliminating non-amplification bit interference (ISI). For example, the first equalizer 12 may be a continuous time linear equalizer (CTLE) and the second equalizer 14 may be a decision feedback equalizer (DFE), but this is only an example and is not limited thereto.

The first equalizer 12 may amplify a signal input through a terminal, and the second equalizer 14 may reduce inter-symbol interference in a signal output from the first equalizer 12 to the second equalizer 14. At this time, the swing level of the signal output from the first equalizer 12 to the second equalizer 14 may fall within a preset range, and the preset range may include the allowable voltage range of the DAC in the second equalizer 14. For example, the preset range may be 800 mV to 1 V, but this is only an example and is not limited thereto.

Meanwhile, the processor 18 may adjust the swing level of the output signal output from the first equalizer 12 to the second equalizer 14. That is, the processor 18 may adjust the equalizer gain of the first equalizer 12 such that the swing level of the output signal output from the first equalizer 12 falls within the preset range.

First, the equalizer gain will be described with reference to FIG. 5.

Figure 5:
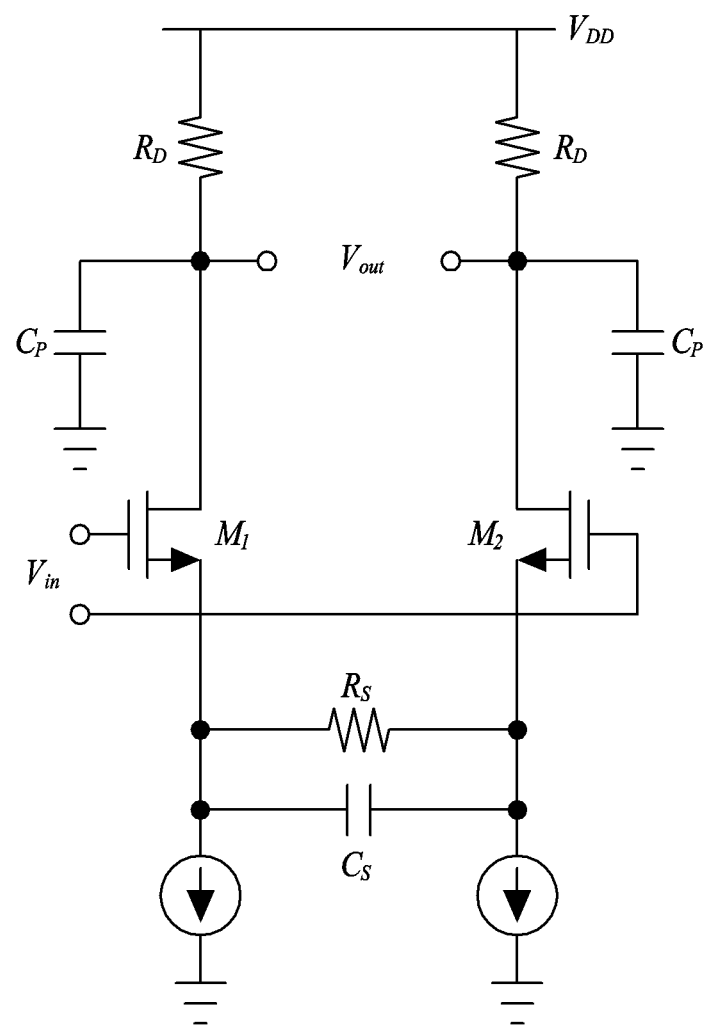
FIG. 5 is a circuit diagram of a continuous time linear equalizer (CTLE).

FIG. 5 is a circuit diagram of a continuous time linear equalizer (CTLE).

When the first equalizer 12 is a CTLE as shown in FIG. 5, a transfer function H(s) and the positions of zero and pole may be calculated as follows.

$$H(s) = \frac{g_m}{C_p} \frac{s + \frac{1}{R_S C_S}}{\left(s + \frac{1 + g_m R_S/2}{R_S C_S}\right)\left(s + \frac{1}{R_D C_p}\right)}$$

$$\omega_z = \frac{1}{R_S C_S},$$

$$\omega_{p1} = \frac{1 + g_m R_S/2}{R_S C_S},$$

$$\omega_{p2} = \frac{1}{R_D C_p}$$

Therefore, DC gain and ideal peak gain may be calculated as follows.

$$DC\ gain = \frac{g_m R_D}{1 + g_m R_S/2},$$

$$Ideal\ peak\ gain = g_m R_D$$

Accordingly, an ideal peak index may be calculated as follows.

$$Ideal\ Peaking = \frac{Ideal\ peak\ gain}{DC\ gain} = \frac{\omega_{p1}}{\omega_z} = 1 + g_m R_S/2$$

The resistor and capacitor of the CTLE may be designed as variable elements. As the values of the resistors and the capacitor are adjusted, the positions of the zero and pole are changed and thus equalizer gain may be adjusted.

Such equalizer gain may include DC gain and AC gain, and signal amplification is determined by the DC gain and the AC gain.

The DC gain is a gain value at a zero frequency in a CTLE transfer function and may be Rs. The AC gain is a gain value at a peak frequency in a CTLE transfer function and may be Cs. Rs and Cs may be adjusted by the operating method of the CTLE.

Accordingly, the processor 18 may first determine DC gain for enabling the swing level of the signal output from the first equalizer 12 to fall within a preset range, by adjusting the DC gain. When the DC gain is determined, the AC gain may be determined by performing error profile while adjusting the AC gain with respect to the determined DC gain.

To this end, the detector 16 may detect the swing level of the output signal output from the first equalizer 12. The processor 18 may adjust the swing level of the output signal such that the swing level of the output signal output from the first equalizer 12 falls within the preset range based on the result of detection of the detector 16.

When the swing level of the output signal output from the first equalizer 12 does not fall within the preset range based on the result of detection of the detector 16, the processor 18 may determine the DC gain by stepwise changing the DC gain until the swing level of the output signal falls within the preset range. A series of operations may be referred to as a DC gain scan function.

Hereinafter, a detailed method will be described with reference to FIG. 6.

Figure 6:
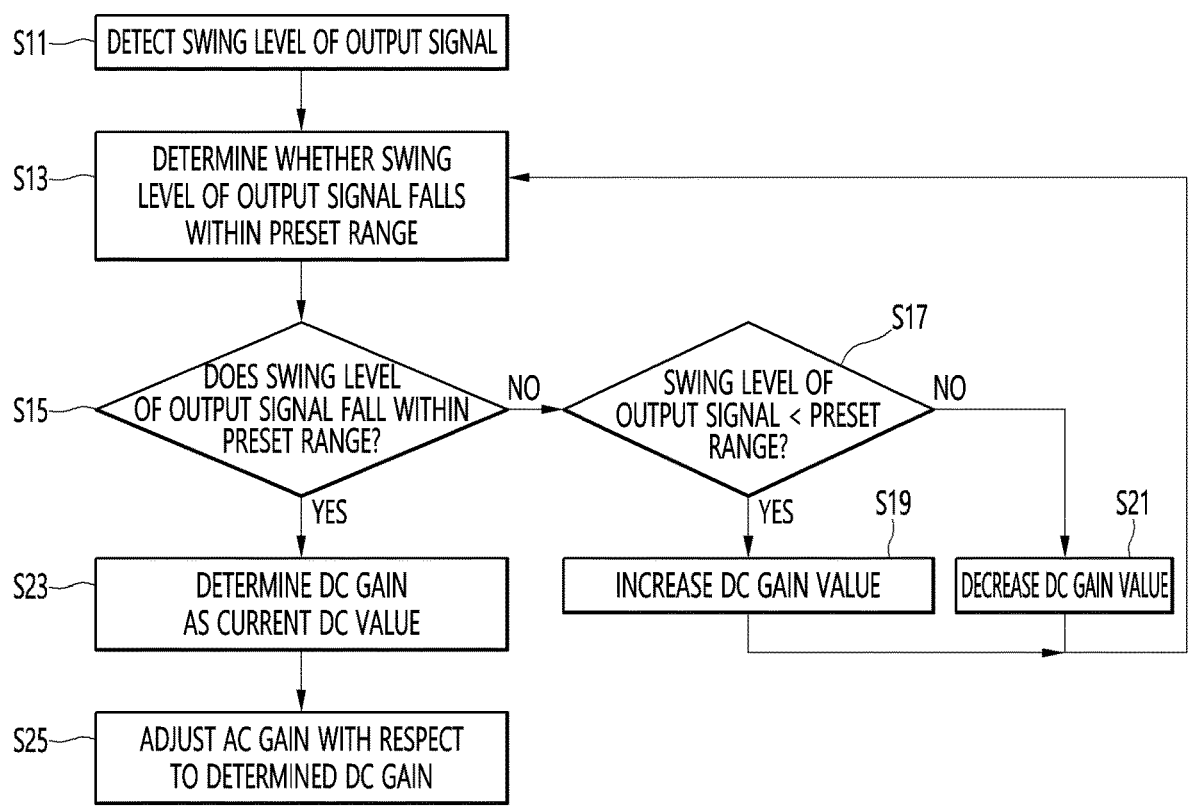
FIG. 6 is a flowchart illustrating a method of operating a signal receiving apparatus according to an embodiment of the present disclosure.

FIG. 6 is a flowchart illustrating a method of operating a signal receiving apparatus according to an embodiment of the present disclosure.

First, the DC gain and the AC gain may be set to a default DC gain value and a default AC gain value, respectively. For example, the default DC gain value and the default AC gain value may be respectively 0 dB and 1 dB, but this is only an example and is not limited thereto.

The processor 18 may detect the swing level of the output signal output from the first equalizer 12 to the second equalizer 14 (S11).

That is, the processor 18 may detect the swing level of the signal processed by the first equalizer 12 through the detector 16.

The processor 18 may determine whether the swing level of the output signal falls within the preset range (S13).

That is, the processor 18 may determine whether the swing level of the signal output from the first equalizer 12 detected by the detector 16 falls within the preset range. Here, the preset range may be the allowable voltage range of the DAC in the second equalizer 14. For example, the preset range may be 800 mV to 1 V, but this is only an example and is not limited thereto.

When the swing level of the output signal does not fall within the preset range (S15), the processor 18 may determine whether the swing level of the output signal is less than the preset range (S17).

For example, when the predetermined range is 800 mV to 1V, the processor 18 may determine whether the swing level of the output signal is less than 800 mV. That is, the processor 18 may determine whether the swing level of the output signal is less than a minimum value of the preset range.

When the swing level of the output signal is less than the preset range, the processor 18 may increase the DC gain value (S19).

For example, the processor 18 may increase the DC gain value by adding a reference value (e.g., 0.5 dB) to the current DC gain value. Here, the reference value is only an example and is not limited thereto.

The processor 18 may determine whether the swing level of the output signal is included in the preset range after increasing the DC gain value (S13).

Meanwhile, when the swing level of the output signal is greater than the preset range, the processor 18 may decrease the DC gain value (S19).

For example, when the swing level of the output signal is greater than a maximum value of the preset range, the processor 18 may decrease the DC gain value.

For example, the processor 18 may decrease the DC gain value by subtracting a reference value (e.g., 0.5 dB) from the current DC gain value. Here, the reference value is only an example and is not limited thereto.

The processor 18 may determine whether the swing level of the output signal falls within the preset range after decreasing the DC gain value (S13).

When the swing level of the signal output from the first equalizer 12 is greater than the preset range, the processor 18 may stepwise decrease the DC gain value until the swing level of the signal output from the first equalizer 12 falls within the predetermined range. On the contrary, when the swing level of the signal output from the first equalizer 12 is less than the preset range, the processor 18 may stepwise increase the DC gain value until the swing level of the signal output from the first equalizer 12 falls within the predetermined range.

That is, the processor 18 may determine the DC gain of the first equalizer 12 such that the swing level of the output signal falls within the preset range.

When the swing level of the signal output from the first equalizer 12 falls within the preset range, the processor 18 may determine the DC gain as a current DC gain value (S23).

Therefore, the swing level of the output signal output from the first equalizer 12 to the second equalizer 14 may fall within the preset range.

Figure 7:
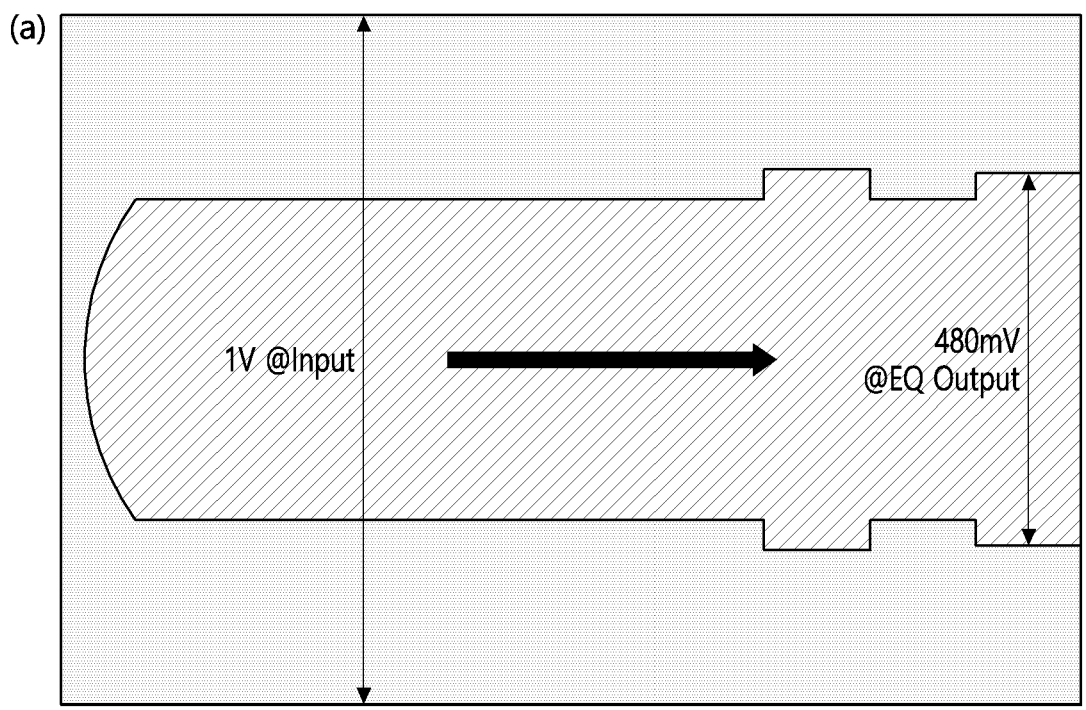
FIG. 7 is a view showing a state in which the swing level of the signal output from the CTLE according to the embodiment of the present disclosure is adjusted.
Figure 7:
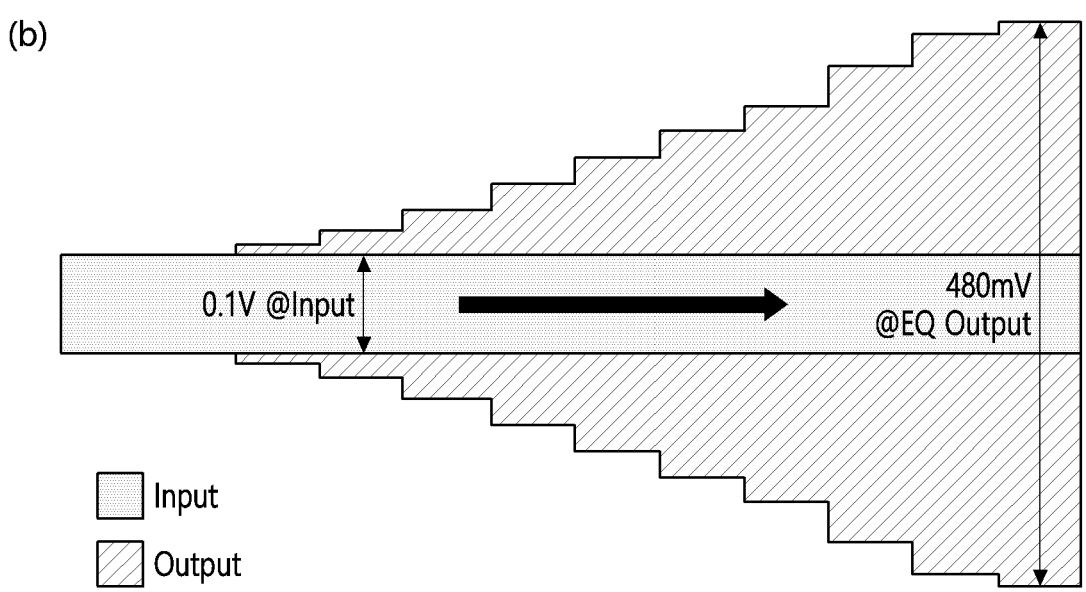

FIG. 7 is a view showing a state in which the swing level of the signal output from the CTLE according to the embodiment of the present disclosure is adjusted.

As shown in (a) of FIG. 7, when the swing level of the signal input to the first equalizer 12 is 1 V, the processor 18 may adjust the swing level of the signal output from the first equalizer 12 to the second equalizer 14 to 480 mV, by changing the DC gain.

Alternatively, as shown in (b) of FIG. 7, when the swing level of the signal input to the first equalizer 12 is 0.1 V, the processor 18 may adjust the swing level of the signal output from the first equalizer 12 to the second equalizer 14 to 480 mV, by changing the DC gain.

That is, the processor 18 may adjust the DC gain such that the swing level of the signal output from the first equalizer 12 to the second equalizer 14 falls within the preset range (or the preset level), regardless of the swing level of the signal input to the first equalizer 12.

FIG. 6 will be described again.

When the DC gain is determined, the processor 18 may adjust AC gain with respect to the determined DC gain (S25).

Specifically, when the DC gain is determined, the processor 18 may determine the AC gain by detecting the error rate of the output signal with respect to the determined DC gain. That is, the processor 18 may detect the error rate of each AC gain with respect to the determined DC gain, and select AC gain with a lowest error rate. Therefore, the processor 18 may acquire AC gain for maximizing the eye open area of the output signal.

For example, when the DC gain is determined, the processor 18 may detect the error rate of each AC gain value while adjusting the AC gain value and determine an AC gain value having a smallest error rate as AC gain.

Error rate detection may include various methods such as a method of counting TMDS (Transition Minimized Differential Signaling) errors, a method of detecting BCH (Bose, Chaudhri, Hocquenghem Code) or ECC (Error Check and Correct Memory) errors, etc.

The first equalizer 12 may perform signal processing according to the DC gain and AC gain determined by the above-described method.

That is, the equalizers 12 and 14 may compensate for the signal received through the terminal according to the DC gain and AC gain determined using the above-described method.

Figure 8:
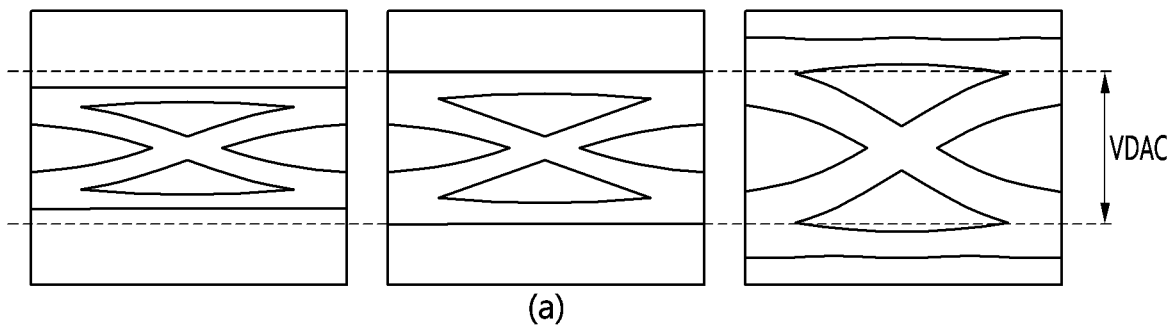
FIG. 8 shows eye diagrams of a signal output from a conventional signal processing apparatus and a signal output from a signal processing apparatus according to an embodiment of the present disclosure.
Figure 8:
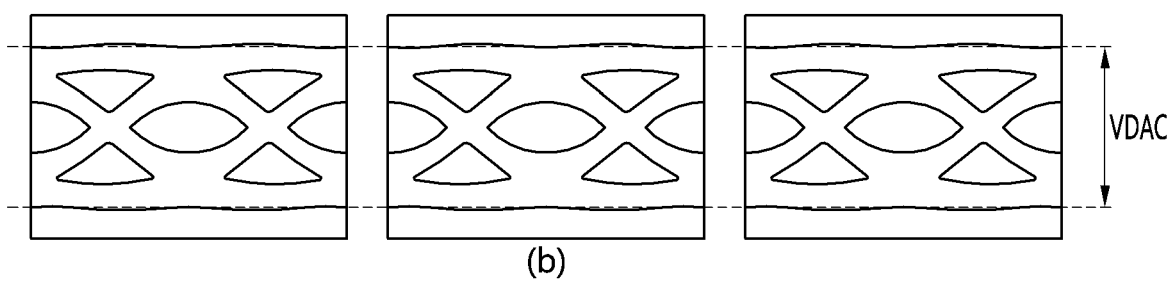

(a) of FIG. 8 is an eye diagram of a signal output from a conventional signal processing apparatus, and (b) of FIG. 8 is an eye diagram of a signal output from a signal processing apparatus according to an embodiment of the present disclosure.

(a) and (b) of FIG. 8 may show the result of measuring signals output when signals having different swing levels (e.g., Signal 1 having a swing level of 1000 mV, Signal 2 having a swing level of 1500 mV and Signal 3 having a swing level of 200 mV) are input to the conventional signal receiving apparatus and the signal receiving apparatus according to the embodiment of the present disclosure. That is, (a) and (b) of FIG. 8 may show results of measuring wavelengths through equipments (e.g., a CTS test equipment and a generator) on a PCB pattern.

Since the equalizer of the conventional signal receiving apparatus does not separately adjust DC gain, an input signal is processed according to predetermined DC gain and thus the change width of the swing level of the signal output from the signal processing apparatus may be large as shown in (a) of FIG. 8. Referring to the detailed example shown in (a) of FIG. 8, the swing level of Signal 1 may be less than VDAC (the allowable voltage range of the digital-to-analog converter (DAC)), the swing level of Signal 2 may be equal to VDAC, and the swing level of Signal 3 may be greater than VDAC. In this case, signal compensation performance of the signal processing apparatus for Signal 1 and Signal 3 is lower than signal compensation performance of the signal processing apparatus for Signal 2. Therefore, it may be difficult to restore required signal quality.

Meanwhile, since the equalizer of the signal apparatus according to the embodiment of the present disclosure adjusts the swing level of the output signal to be included in VDAC by adjusting DC gain according to the swing level of the input signal, as shown in (b) of FIG. 8, the swing levels of the output signals may be constantly maintained in the VDAC range (e.g., 800 mV to 1 V). Accordingly, the signal processing apparatus according to the present disclosure is advantageous in that signal compensation performance is guaranteed regardless of the swing level of the input signal and required signal quality can be restored.

Accordingly, the signal apparatus according to the present disclosure has an advantage of improving responsiveness to various source apparatus and various cables. That is, according to the present disclosure, flexible signal process is possible regardless of the magnitude of the signal transmitted from the source apparatus or the length of the cable.

According to the present disclosure, since operation stability of an equalizer is secured and performance is improved, inter-symbol interference is further reduced.

According to the present disclosure, since adaptive equalizer gain adjustment is possible with respect to an input signal, it is possible to maximize compensation efficiency of signals received through various cables and various signal transmitting apparatuses.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. A signal receiving apparatus comprising:
   a terminal configured to receive a signal from an external device; and
   an equalizer configured to reduce inter-symbol interference of the signal received through the terminal, wherein the equalizer comprises a continuous time linear equalizer (CTLE) configured to amplify the signal received through the terminal and a decision feedback equalizer (DFE) configured to reduce inter-symbol interference in a signal output from the CTLE,
   wherein a swing level of the signal output from the CTLE is maintained in a preset range.

2. The signal receiving apparatus of claim 1, further comprising a processor configured to adjust the swing level of the output signal.

3. The signal receiving apparatus of claim 2, further comprising a detector configured to detect the swing level of the output signal,
   wherein the processor is configured to adjust the swing level of the output signal such that the swing level of the output signal falls within the preset range based on a result of detection of the detector.

4. The signal receiving apparatus of claim 2, wherein the processor is configured to determine DC gain of the CTLE for enabling the swing level of the output signal to fall within the preset range.

5. The signal receiving apparatus of claim 4, wherein the processor is configured to determine the DC gain by stepwise changing the DC gain until the swing level of the output signal falls within the preset range.

6. The signal receiving apparatus of claim 4, wherein, when the DC gain is determined, the processor is configured to determine AC gain by detecting an error rate of the output signal with respect to the determined DC gain.

7. The signal receiving apparatus of claim 6, wherein the equalizer compensates for the signal received through the terminal according to the determined DC gain and the AC gain.

8. A signal processing method of a signal receiving apparatus, the signal processing method comprising:
   receiving a signal from an external device; and
   performing signal processing to reduce inter-symbol interference of the received signal through an equalizer, wherein the equalizer comprises a continuous time linear equalizer (CTLE) configured to amplify the signal received from the external device and a decision feedback equalizer (DFE) configured to reduce inter-symbol interference in a signal output from the CTLE, wherein a swing level of the signal output from the CTLE is maintained in a preset range.

9. The signal processing method of claim 8, further comprising determining DC gain of the CTLE for enabling the swing level of the output signal to fall within the preset range.

10. The signal processing method of claim 9, wherein the determining of the DC gain comprises determining the DC gain by stepwise changing the DC gain until the swing level of the output signal falls within the preset range.

11. The signal processing method of claim 9, further comprising, when the DC gain is determined, determining AC gain by detecting an error rate of the output signal with respect to the determined DC gain.

* * * * *